UNITED STATES PATENT OFFICE.

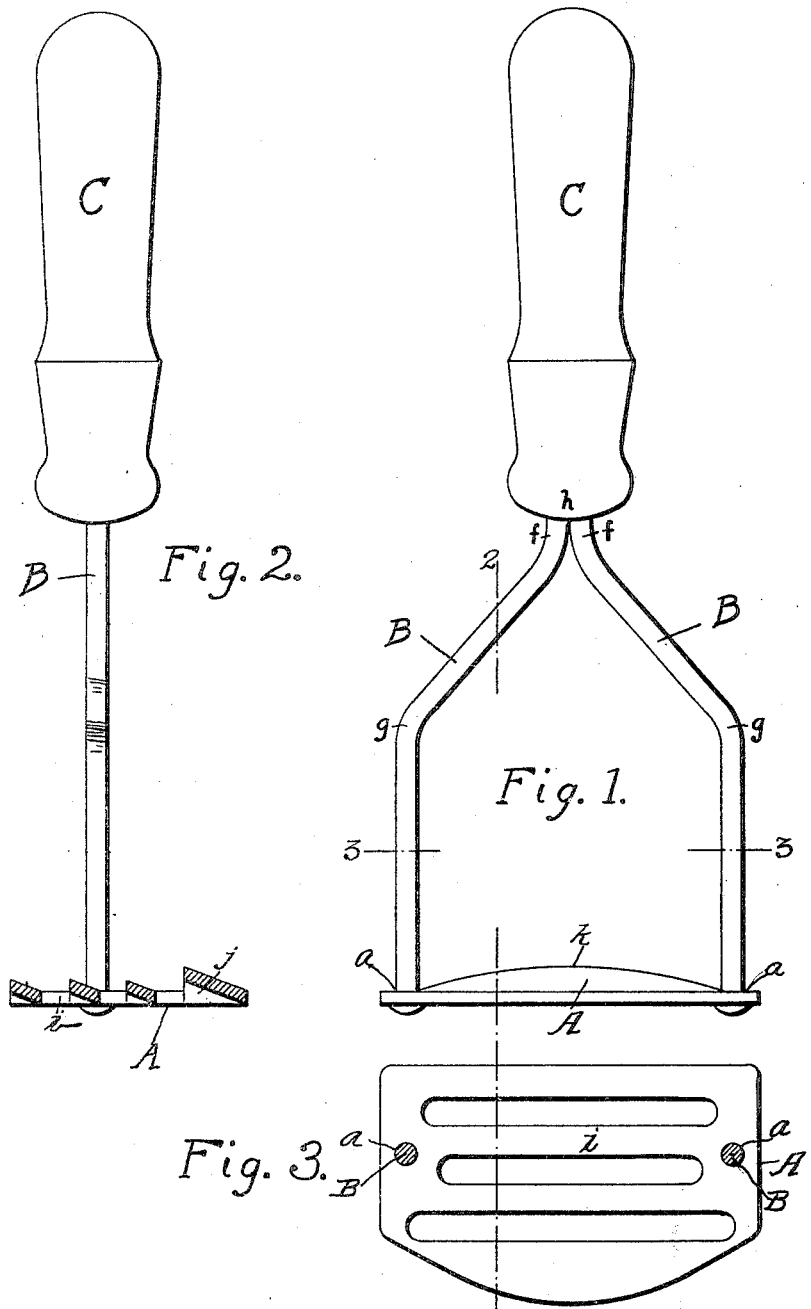

REUEL T. MARKEE AND JAMES RALSTON FOUGHT, OF PHILADELPHIA, PENNSYLVANIA, ASSIGNORS TO JAMES R. FOUGHT, OF PHILADELPHIA, PENNSYLVANIA.

BUTTER-MIXER.

1,232,356. Specification of Letters Patent. Patented July 3, 1917.

Application filed August 11, 1916. Serial No. 114,387.

*To all whom it may concern:*

Be it known that we, REUEL T. MARKEE and JAMES RALSTON FOUGHT, citizens of the United States, residing at Philadelphia, in the county of Philadelphia and State of Pennsylvania, have invented certain new and useful Improvements in Butter-Mixers, of which the following is a specification.

The object of our invention is to provide a simple and inexpensive butter mixer.

In the accompanying drawing:—

Fig. 1, is a side view of our improved mixing device;

Fig. 2, is a vertical sectional view on the line 2—2, Fig. 1; and

Fig. 3, is a sectional plan view on the line 3—3, Fig. 1.

A is a plate having a series of bars $i$ spaced apart and connected at their ends. The bars are bent so as to form inclined blades, as clearly shown in Fig. 2; the bars increasing in height as they near the center of the plate.

The plate is flat as shown and rounded on one side, as at $k$, and straight on the opposite side. The plate is perforated at $a, a$ and extending through the perforations are the stems B, B, forming the handle. The stems are riveted to the plate as shown and the ends of the stems are bent at $g, g$ and $f, f$ and are secured to the handle C in any suitable manner.

The butter is placed in a suitable vessel and the mixer is worked up and down, the round edge $k$ being preferably held against the round surface of the vessel. The up and down movement causes the butter to be forced through the slots between the bars $i$ and the inclined surfaces $j$ of the bars cause the material to pass through the plate at an angle, thoroughly mixing the butter or other material.

The device can be made very cheaply and can be used in mixing small quantities of butter, and it can also be used in mixing butterin, oleomargarin and like material.

We claim:—

1. A device for mixing butter, consisting of a flat plate having a series of longitudinal bars spaced apart, the bars being bent at an angle all in one direction and being greater in height at the center than at the ends, and a handle secured to the plate.

2. The combination in a butter mixer, of a flat plate having a series of longitudinal bars spaced apart, the bars being bent at an angle, one edge of the plate being round and the other straight, and a forked handle secured to the plate.

In testimony whereof we affix our signatures in presence of two witnesses.

REUEL T. MARKEE.
JAMES RALSTON FOUGHT.

Witnesses:
JAMES F. SMYTH,
BENJAMIN CESARIO.

Copies of this patent may be obtained for five cents each, by addressing the "Commissioner of Patents, Washington, D. C."